US006226271B1

(12) United States Patent
Dent

(10) Patent No.: US 6,226,271 B1
(45) Date of Patent: May 1, 2001

(54) RECEIVED SIGNAL STRENGTH DETERMINATION METHOD, APPARATUS AND COMPUTER PROGRAM PRODUCTS

(75) Inventor: Paul Wilkinson Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/938,905

(22) Filed: Sep. 26, 1997

(51) Int. Cl.⁷ .................................................. H04Q 7/00
(52) U.S. Cl. ...................... 370/252; 455/226.2; 370/332
(58) Field of Search ................................... 370/252, 332, 370/331; 455/226.2, 226.1

(56) References Cited

U.S. PATENT DOCUMENTS

| 3,866,024 | 2/1975 | Williams ............................... 377/44 |
| 4,531,235 | * 7/1985 | Brusen .................................. 455/273 |
| 4,868,885 | 9/1989 | Perry ....................................... 455/10 |
| 5,390,365 | 2/1995 | Enoki et al. ........................ 455/54.1 |
| 5,655,002 | * 8/1997 | Proctor et al. ........................ 455/450 |
| 5,703,902 | * 12/1997 | Ziv et al. .............................. 375/200 |
| 5,793,805 | * 8/1998 | Nikides ................................. 375/224 |
| 5,923,454 | * 7/1999 | Eastmond et al. .................... 359/189 |
| 6,049,715 | * 4/2000 | Willhoff et al. ..................... 455/436 |

FOREIGN PATENT DOCUMENTS

| 0 296 071 | 12/1988 | (EP) . |
| 0 591 846 | 4/1994 | (EP) . |
| 2 217 883 | 11/1989 | (GB) . |
| WO97/00562 | 1/1997 | (WO) ............................. H04B/17/00 |

OTHER PUBLICATIONS

International Search Report—PCT/US98/19813.
Methods to Approximate the Logarithm of a Sum, *IBM Technical Disclosure Bulletin*, vol. 32, No. 5A, Oct. 1989, pp. 398–399.

* cited by examiner

Primary Examiner—Chau Nguyen
Assistant Examiner—Dung Trinh
(74) Attorney, Agent, or Firm—Myers Bigel Sibley & Sajovec

(57) ABSTRACT

A signal strength for a received signal such as a radio signal transmitted over a wireless network is determined based on a large number of sample measurements of the received signal which may be taken over disjoint time intervals. Each sample is digitized so as to take on one of a discrete number of values, for example, 256 possible values for an 8-bit converter. The number of occurrences for each of the values is accumulated in bins (counters) and the indication of signal strength is determined by a summation of the measured values based on processing of the counts rather than the sample measurements themselves. The signal strength measurements are provided as monotonically related values, more particularly, logarithmic magnitude representations of the measured signal strength of each sample measurement. Bin counts are reduced iteratively by replacing counts greater than 1 by incrementing the count of a proportionately higher value bin until only counts of 1 or zero remain. These counts are then combined to provide only a single counter with a non-zero count value which indicates the accumulated signal strength of the signal strength measurements. The invention may further be provided using single bit memory elements and byte processing with look-up tables to provide even more efficient processing of the logarithmic signal strength measurements to reduce power consumption for battery powered devices such as cellular radiotelephones.

36 Claims, 12 Drawing Sheets

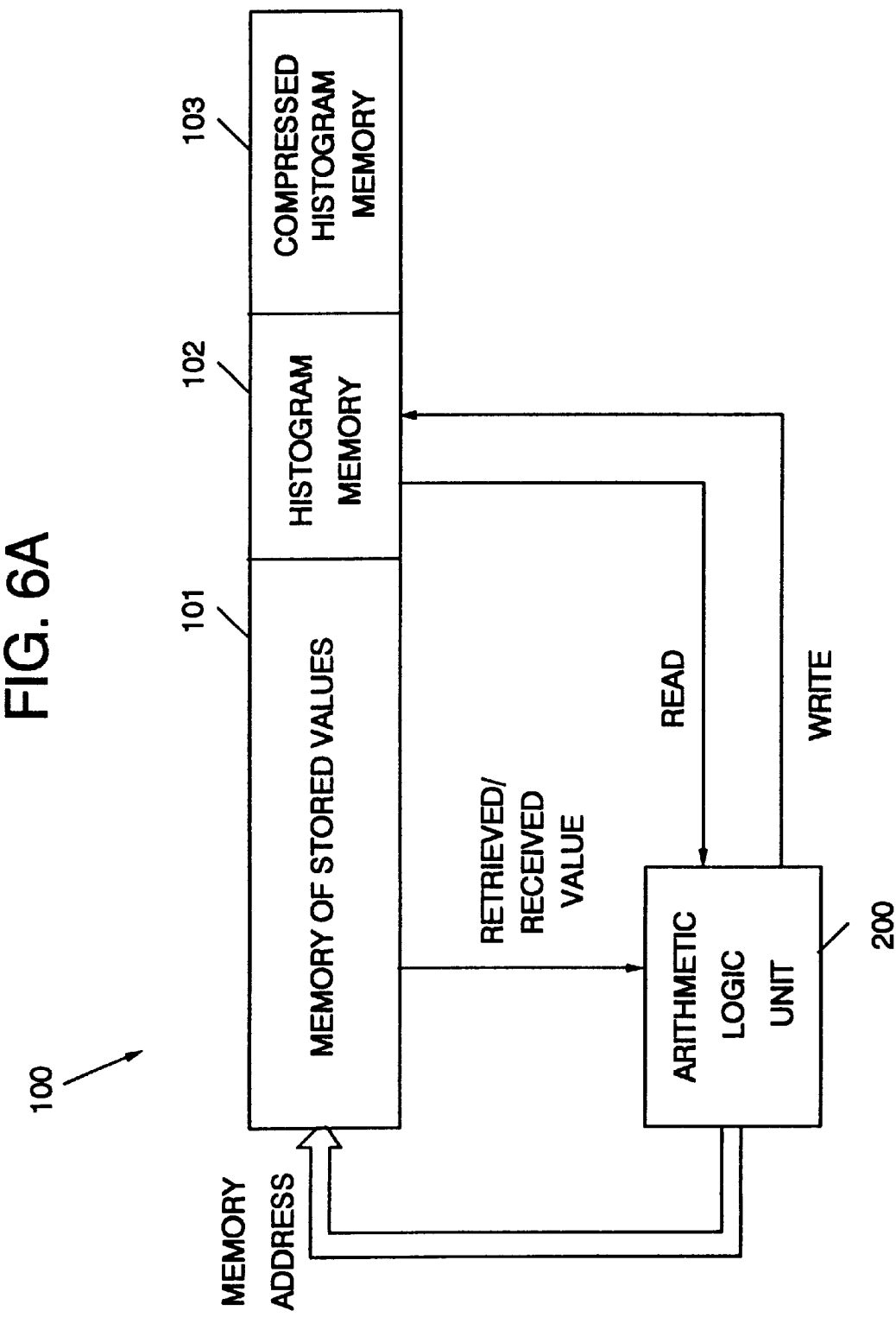

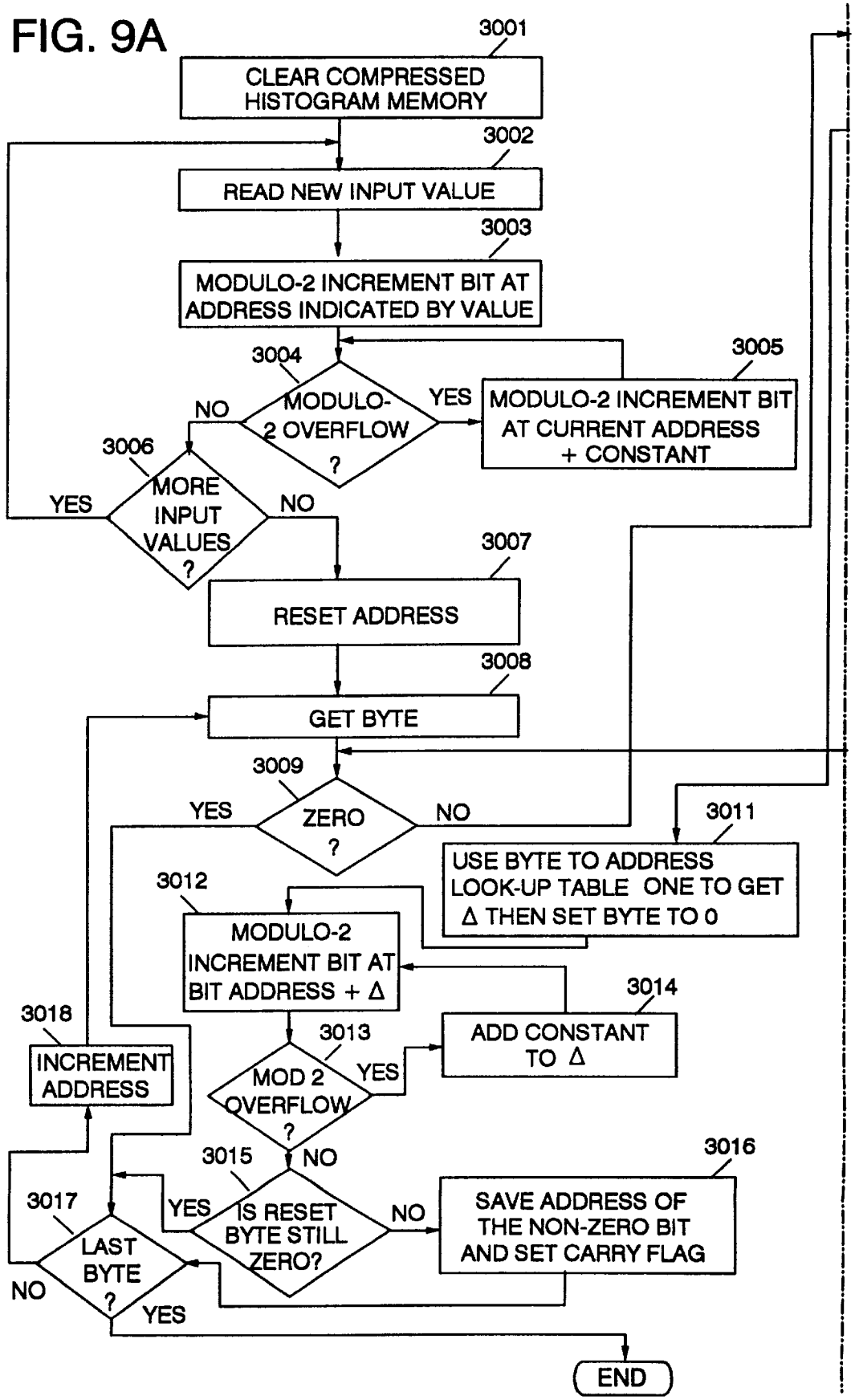

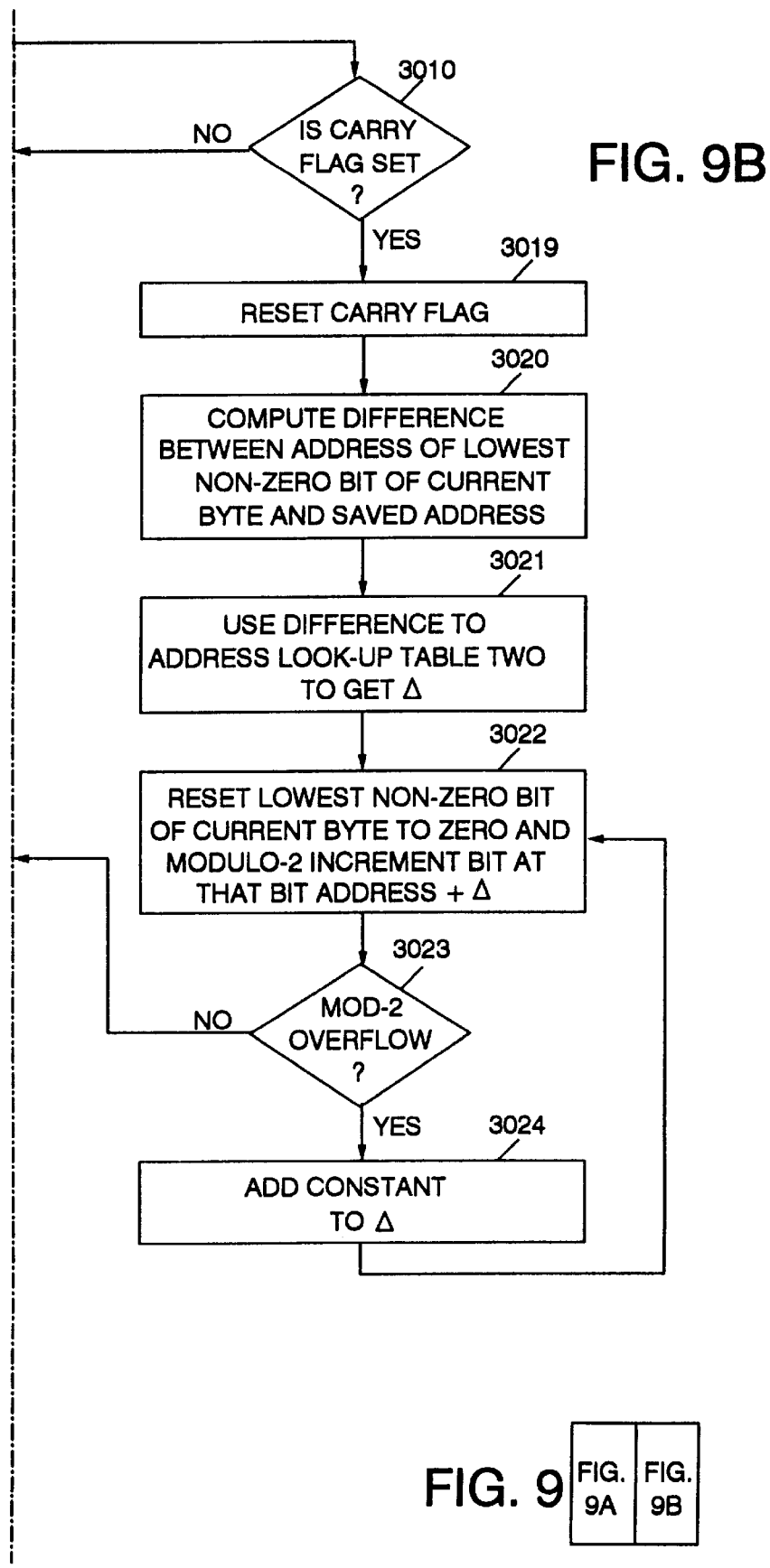

RECEIVED SIGNAL STRENGTH DETERMINATION METHOD, APPARATUS AND COMPUTER PROGRAM PRODUCTS

FIELD OF THE INVENTION

The invention relates to communication networks and, more particularly to the determination of received signal strength in communications networks.

BACKGROUND OF THE INVENTION

Communication networks typically include at least one sender and one receiver. In either a wired or wireless network, a signal transmitted between the sender and receiver must be of sufficient magnitude (or strength) to allow the information contained within the signal to be discriminated from the noise which is generally present in the communication network. This may be a greater problem with a wireless network, which typically is more susceptible to noise from various interference sources.

An example of a wireless network is a radio network such as a cellular network commonly utilized for voice and/or data communications between a fixed base station covering a geographic region and mobile devices such as cellular terminals (or phones) present in the covered region. A cellular phone typically includes a radio receiver including an antenna for receiving signals and an amplifier/detector for generating a measure of the strength of received signals or noise. A signal strength measure, commonly known as Radio Signal Strength Indication (RSSI), may be expressed as a logarithmic measure of received signal strength and may be converted to a digital form by an analog to digital converter.

It is known in the prior art that radio signal strength measurements can be useful in determining which base station should serve a cellular phone during a call. Cellular phones using a Time Division Multiple Access method conforming to either the European cellular standard known as GSM or either of the American TDMA standards known respectively as D-AMPS or PCS1900 use spare time between transmit and receive timeslots to change frequency and monitor the signal strengths of other base stations. Several measurements of signal strength are typically averaged for the same base station. The averages are reported to the currently serving base station, which determines if a handoff should be made to another, stronger base station. Determination of average signal strength can comprise performing a series of measurements that are digitized at the sampling rate of an analog to digital convertor which is used for demodulating traffic symbols, i.e., the sampling rate may be one or more times the traffic symbol rate. The measurements are preferably averaged over a TDMA timeslot or other measurement window in order to reduce the effects of fading and noise. Thus, it is known to be useful to average RSSI measurements.

In the prior art, RSSI measurements are typically obtained on a logarithmic scale in order to encompass a large dynamic range of possible signal values, see for example U.S. Pat. No. 5,048,059, which is hereby incorporated by referenced herein in its entirety. In conventional systems, when RSSI measurements obtained in logarithmic form were to be averaged, it was typically considered acceptable to average the logarithmic values because the effort to perform an antilogarithm, which is needed to obtain a true power average, was considered excessive. There is however, an inherent inaccuracy in averaging logarithmic values by this method. Average logarithmic RSSI values could be obtained by analog means, using a resistor-capacitor smoothing filter, or by using a capacitor to integrate an RSSI-dependent current over an averaging window in an analog integrate-and-dump circuit. The latter method is useful when the signal strength has to be averaged over a rectangular measurement window such as a TDMA timeslot, and was used in the first GSM cellular telephone sold by L. M. Ericsson AB in Europe. In co-pending application Ser. No. 08/768, 975 (Dent, Filed Dec. 18, 1996) entitled "Method of Obtaining Initial Synchronization," a method to obtain synchronization with a communications satellite signal received at extremely low signal to noise ratios is described. This application is also incorporated by reference herein in its entirety. The disclosed method can require the summation of very large number of RSSI measurements made during disjointed time periods.

A problem with these previously known methods for measuring signal strength is the processing load required for averaging a large number of values taken over disjointed time periods. This processing load may particularly be a problem for mobile devices such as cellular phones which typically operate for extended periods on battery power. Excessive processing load may reduce operating life available to the user of the cellular phone.

SUMMARY OF THE INVENTION

It is, therefore, an object of the present invention to provide an improved and more energy efficient method and system for calculating a received signal strength indication.

It is a further object of the present invention to provide a method and system which calculates a received signal strength indication by efficiently adding and thereby averaging a large number of logarithmically represented signal strength values.

The present invention determines a signal strength of a received signal by averaging a large number of signal strength measurements (or RSSI's) of a signal taken over a disjoint period of time. This averaging is accomplished by counting the number of occurrences of measurements of each of a discrete number of possible values which are monotonically related, preferably logarithmic values. The counts are then iteratively reduced according to the present invention until only a single non-zero value remains which represents the accumulated value of all of the samples taken during the sampling period chosen for determining the signal strength. By utilizing counts of discrete values instead of the actual logarithmic values, the present invention beneficially decreases processing load in comparison to logarithmic addition of actual logarithmic values. The present invention thereby reduces the power consumed in determining the signal strength by utilizing the novel methods and apparatus of the present invention which, in part, utilize memory in place of processing power for generation of the summation of the samples. Moreover, a result that is a more accurate representation of the signal power average is obtained. This may provide greater battery life in devices such as battery-operated cellular phones.

According to one embodiment of the present invention, a large number of signal strength measurement values are optionally collected in a first memory and then retrieved from memory to construct a histogram. Alternatively, the values are directly collected in a histogram memory indicating the number of times each possible discrete value was observed. The number of histogram bins is only of the order of the number of possible quantized RSSI values (e.g. 256 in the case of 8-bit quantization) which is much smaller than the number of values typically received and processed. In one embodiment, the present invention calculates the logarithm of the sum of the values whose logarithms are given by the coarsely digitized RSSI values by starting with a first bin (or counter) corresponding to the lowest RSSI value, the content indicating the number of times that value was observed is read out and used as the address for a look-up table to obtain the logarithm of that number, to the same base i.e. on the same logarithmic scale as the RSSI values themselves. The log of the bin count is read from the look-up table and added to the address of the bin to obtain a value indicative of the log of the sum of the energy values collected in that histogram bin. The logsum value is then the address of a new, higher-number-addressed histogram bin corresponding to the new, summed energy and the new, higher-numbered bin count is incremented by one, while the original, first bin optionally has its contents reset to zero. The method or apparatus then proceeds to process the next highest histogram address in a similar way with any bin which contains a count of zero being skipped. If a bin contains a count of one, the bin number is remembered and then the method or apparatus proceeds to increment the address until it points to a higher addressed bin with a non-zero count, and the remembered address, i.e. the number of increments made to the address, is used as the address to a second look-up table from which a delta-log value is obtained, being the amount by which a logarithm corresponding to the higher address must be increased to represent the logarithm of the sum of the energies represented logarithmically by the higher address and the lower, remembered address. The count in the bin with the higher address is then decremented (and optionally the count in the bin with the lower address is reset to zero) and the higher address then incremented by adding the delta-log value and the result used as the address for an even higher-addressed bin-number, the contents of which are then incremented by one. The original higher-address bin is then returned to for the contents to be processed, if still non-zero, in one of the above manners.

The method continues until all bin contents have been processed and a single value remains, which is the desired logarithmic sum. If this value or any preceding intermediate calculated address represents a bin number beyond the highest numbered bin, lower bin locations that have already been processed can be re-used to hold these overflow values in a circular buffer fashion.

In one embodiment of the present invention a method is provided for determining a signal strength of a received signal. A plurality of signal strength measurements are taken of the signal, the signal strength measurements being characterized in that they are selected from a predetermined number of values. The number of occurrences of the signal strength measurements corresponding to each of the predetermined number of values are accumulated. The signal strength of the signal is then determined from the accumulated number of occurrences. Accordingly, the signal strength is determined based on a count of the number of occurrences of each of a discrete number of possible values rather than from the actual values of the typically much larger number of actual sample RSSI values.

In one embodiment of the methods of the present invention, the accumulating step comprises the step of accumulating the number of occurrences of the signal strength measurements in a plurality of counters, each counter being associated with one of the predetermined number of values. The methods of the present invention are particularly suited to determination of the signal strength where the discrete number of possible values are monotonically related to the signal strength measurements such as logarithmic values (of base 10 or other base such as natural log values).

In a further aspect of the present invention the step of determining the signal strength comprises the step of reducing a value count of a first one of the plurality of counters having a value count greater than one by decreasing the value count of the first one of the plurality of counters and incrementing a second one of the plurality of counters. More particularly, the second one of the plurality of counters preferably has an associated signal strength measurement value corresponding to a multiple of the associated signal strength measurement value of the first one of the plurality of counters. A third one of the plurality of counters is in turn incremented if the second one of the plurality of counters overflows. The reducing step is repeated iteratively until none of the plurality of counters have a value count greater than one.

In another embodiment of the methods of the present the step of determining a signal strength further comprises the step following the step of repeating of storing the value counts of each of the plurality of counters in single bit memory elements. A non-zero count in two of the plurality of counters is replaced by incrementing another of the plurality of counters. This replacing step is repeated by replacing a non-zero count in two of the plurality of counters by incrementing another of the plurality of counters until only one of the plurality of counters contains a non-zero count corresponding to a sum of the plurality of signal strength measurements to thereby provide an indication of the signal strength.

In a further embodiment of the present invention, a method is provided for determining a signal strength of a received signal using single bit memory elements each of which corresponds to one of a discrete number of values representing signal strength magnitude of the received signal. The single bit memory elements are first initialized to zero. A signal strength measurement is taken of the signal to provide a signal strength measurement value. A first one of the single bit memory elements corresponding to the signal strength measurement value is incremented using modulo-2 arithmetic. A second one of the single bit memory elements corresponding to twice the value of the first one of the single bit memory elements is incremented using modulo-2 arithmetic if a carry is generated by the step of incrementing a first one of the single bit memory elements. Any carry from the incrementing a second one of the single bit memory elements step is propagated by iteratively incrementing a single bit memory element corresponding to twice the value of a single bit memory element generating a carry. Operations are repeated until a desired number of signal strength measurements have been accumulated to provide a non-zero one of the single bit memory elements corresponding to one of the discrete number of values indicating the sum of the signal strength measurements. In one embodiment, the single bit memory elements having corresponding values related by a factor of two are chained together to form a binary word.

The present invention is particularly beneficial when the received signal is a signal received over a communications medium at a receiver station from a sender station. More particularly, the present invention is beneficial for use where the communications medium is a wireless communications medium such as a cellular system.

While the present invention has been summarized above with respect to the methods of the present invention, it is to be understood that the present invention is also directed to apparatus and computer program products for carrying out the operations described above with respect to the method aspects of the present invention as will be described more fully herein.

Using the above methods, apparatus and computer program products, the amount of processing effort is related to the number of histogram bins and not to the much larger number of received values, thus effecting a saving in processing power. Moreover, the addition of logarithmically coded values in value-sorted order of smallest to largest is optimum for preventing undue loss of accuracy due to finite precision and rounding errors.

BRIEF DESCRIPTION OF THE DRAWINGS

FIG. 6A is a schematic block diagram of a processor architecture according to an embodiment of the present invention.

FIG. 8 is a schematic illustrating the relationship between FIG. 8A and FIG. 8B.

FIG. 9 is a schematic illustrating the relationship between FIG. 9A and FIG. 9B.

FIG. 9A is a flowchart illustrating operations according a further embodiment of the present invention.

FIG. 9B is a flowchart illustrating operations according a further embodiment of the present invention.

DETAILED DESCRIPTION OF ILLUSTRATED EMBODIMENTS

The present invention now will be described more fully hereinafter with reference to accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
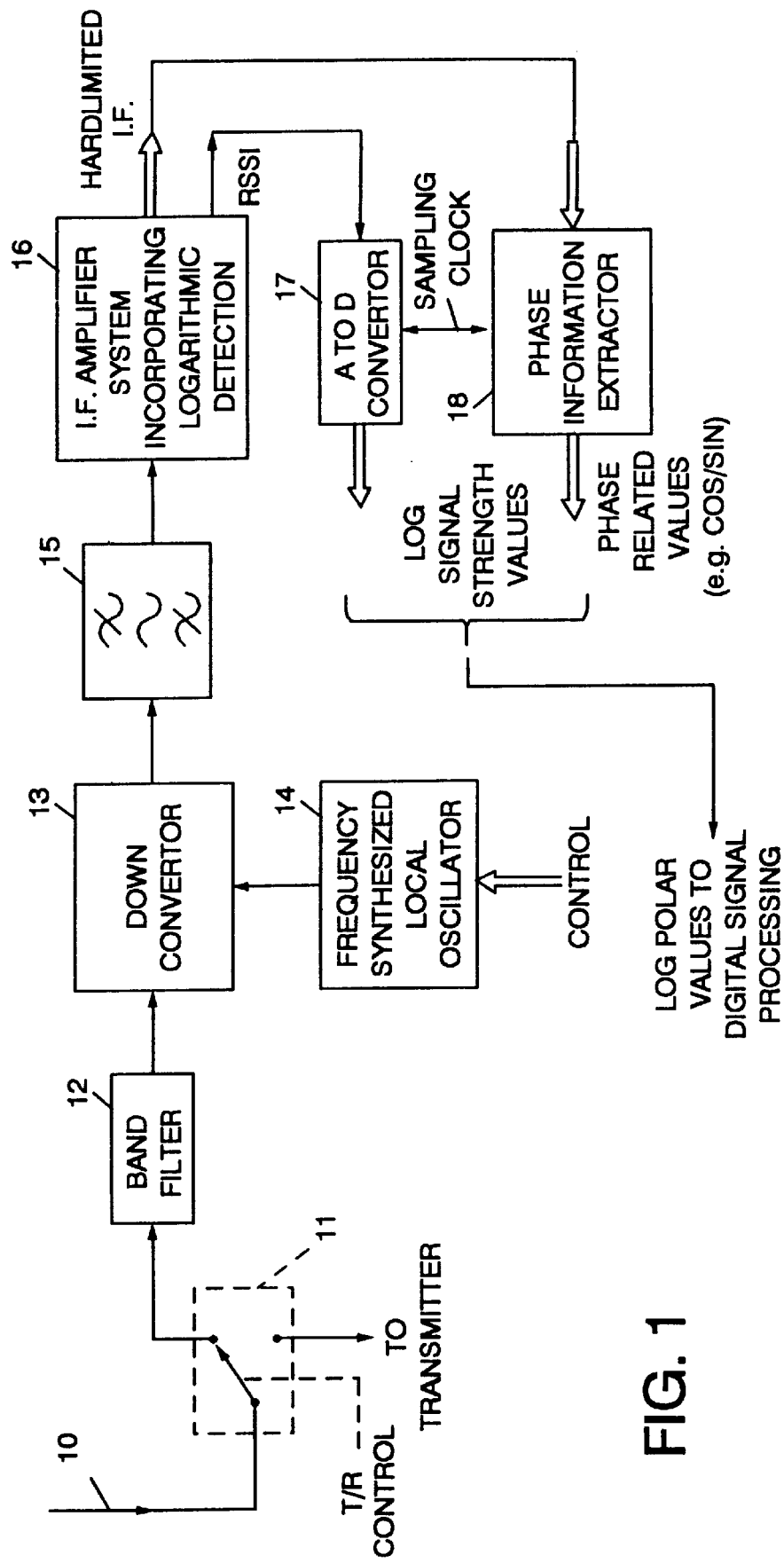
FIG. 1 is a block diagram illustrating a signal receiver apparatus for use with the present invention.

Referring now to FIG. 1, the operating environment for the present invention will be described for calculating a signal strength of a sampled received signal in a cellular phone. FIG. 1 illustrates a typical receiver block diagram for receiving cellular or satellite signals. An antenna 10 is connected by Transmit/Receive switch 11 alternatively to a receiver or a transmitter depending on whether the cellular phone is transmitting or receiving a communication signal. The receiver in the illustrated embodiment includes band-limiting filter 12, downconvertor 13, local oscillator 14, first IF filter 15 and IF amplifier system 16. As illustrated in FIG. 1, IF amplifier system 16 is assumed to incorporate a detector or other means for taking a plurality of signal strength measurements of the signal to measure instantaneous signal strength on an approximately logarithmic scale in order to generate a signal strength measurement. The signal strength measurement is subsequently sampled and digitized by AtoD convertor 17. The signal strength measurements are selected from a predetermined number of values by AtoD convertor 17. The IF amplifier system 16 may further output a hardlimited first or second IF signal containing instantaneous signal phase information to phase digitizer 18, which outputs digitized values related to phase such as the cosine and sine of the phase or the phase value itself. The digitized signal strength measurement values may contain two components, one approximately proportional to the logarithm of the instantaneous signal amplitude and the other phase related values measured at the same sampling clock. The combination of these aspects of the digitized signal strength measurement values form a series of logpolar values which represent the full, complex-vector nature of the received signal when practicing the logpolar technique of above-incorporated U.S. Pat. No. 5,048,059. The logpolar values may then be processed in a digital signal processor (not shown) to extract information.

The current invention is particularly directed to processing the signal strength measurement values to obtain an average indication of received signal energy over some averaging window which may include disjoint periods of time, the average indication representing an estimate of the RSSI of the signal being measured. It will be appreciated that digital averaging may be better suited to computing averages over disjointed periods of time. However, it can be more burdensome, particularly in terms of power consumption, to accumulate, integrate or sum a larger number of values digitally as compared to using an analog method. The invention seeks to reduce the effort involved in adding or accumulating a large number of signal strength measurement values.

According to a first aspect of the invention, when the number of values to be summed is much greater than the number of possible different values (i.e., output bit patterns) that the AtoD convertor can produce, it is only necessary to count how many times each of the possible values is observed over the summation window. If the AtoD convertor is an 8-bit convertor, for example, only 256 possible different values can be produced at its output. These values might typically correspond to signal strength measurements on a logarithmic decibel scale having a range of 128 dB in 0.5 dB steps. The least significant bit of a bit pattern corresponds to a 0.5 dB step, the second least significant bit corresponds to a 1 dB step, and so on up to a most significant bit which corresponds to a 64 dB step. Because the AtoD convertor produces 256 different output values, only 256 counters are needed to remember how many times each output was produced, regardless of how many signal strength measurement samples are actually taken. The 256 counters may conveniently be represented by 256 random access memory locations within a microprocessor memory, each having an address. If the memory addresses are considered to start at a value equal to the lowest signal strength that can be measured (e.g., below the lowest noise level) and increase sequentially, each address can be considered to be equal to a corresponding signal strength. As used in describing the embodiments of the present invention herein, the "counters" will also be referred to as "memory locations" or "bins."

Each time the AtoD convertor samples the signal strength measurement, an address (memory location) corresponding to the AtoD convertor's output (the digitized signal strength measurement value) is incremented by one to record the occurrence of that particular signal strength measurement value. The counts are preferably reset to zero at the beginning of a period of measurement accumulation.

Figure 2:
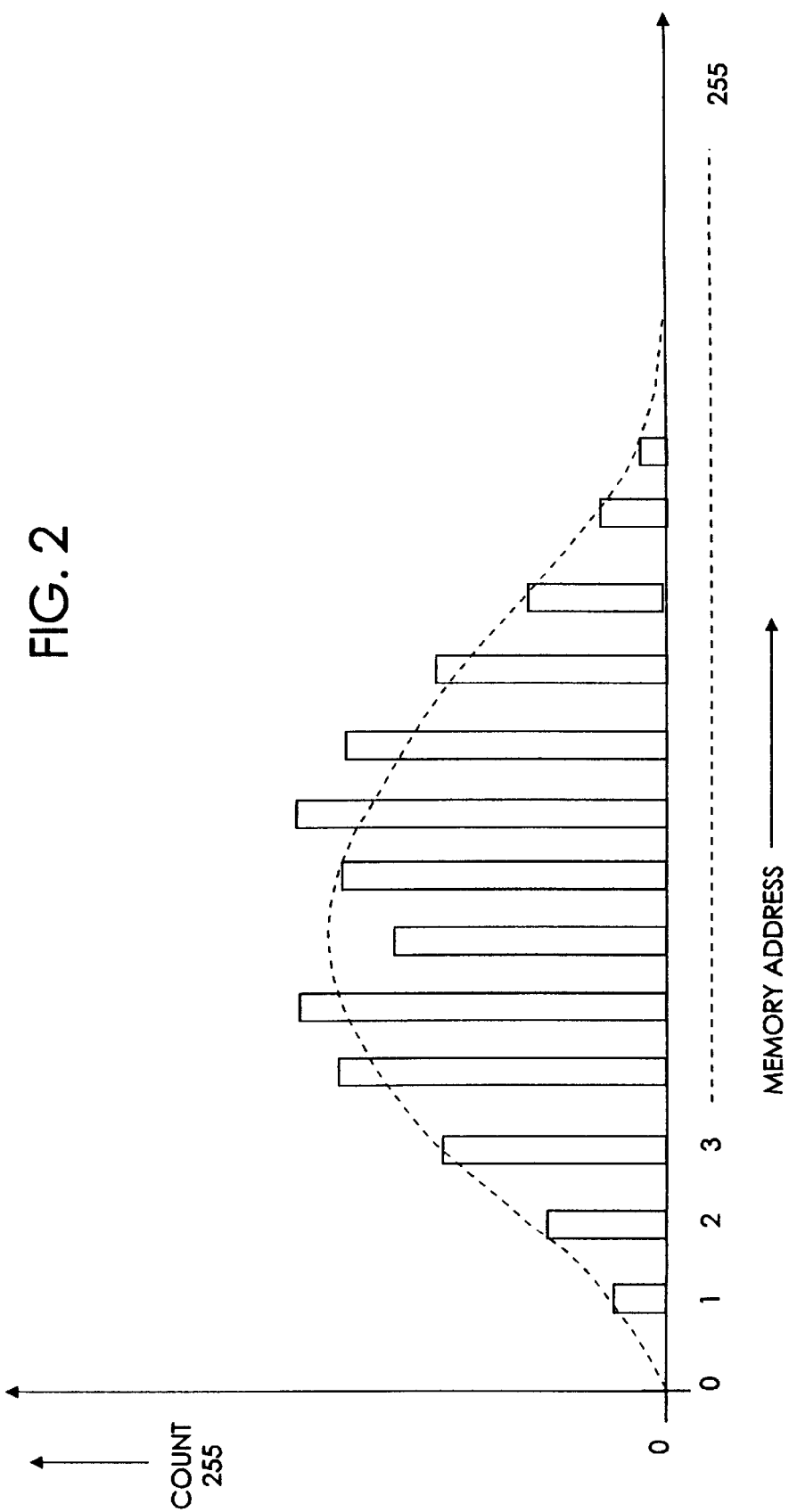
FIG. 2 is a graphical illustration of a plurality of signal strength measurements obtained according to an embodiment of the present invention.

At the end of the period of observation, the contents of the memory locations provide a histogram of the received signal strength probability distribution as shown in FIG. 2. Typically, not all counters will be populated with a non-zero count. The distribution will generally be expected to be concentrated around a region of signal strength narrower than the full receiver dynamic range. If the number of measurements taken is not too great, such that the number of observations of any particular value is not expected to exceed 255, the count can be contained within one 8-bit byte. However, a further aspect of the invention compensates for overflow of a bin count. Because an overflow in the exemplary embodiment of one 8-bit byte bins indicates that the same value has been observed 256 times, the total energy of those observations is simply 256 times the energy of a single value which on a dB scale is $10 \, LOG_{10}(256)$, or 24.08 dB more than the single value.

Assuming the addresses (memory locations) represent signal strength in decibels in 0.5 dB steps as in the described embodiment, instead of placing a count of 256 in one bin, a count of 1 is placed in the bin 24.08 dB higher, i.e., in bin (address plus 48). The overflowed bin automatically resets to zero as required. (i.e. when the bin count overflows from 11111111 to 00000000 when counting from the 255th to the 256th occurrence of a corresponding signal strength measurement from the AtoD converter in the 8-bit byte embodiment of the bins). This overflow process can be implemented by chaining together into one longer binary word, byte addresses that are 48 apart in memory corresponding to the 24.08 dB higher as discussed above. Therefore, overflow of single-byte count values upon incrementing a count of 255 to become once more equal to zero is accounted for by incrementing the next byte in the chain, i.e., the byte 48 higher in memory. It is to be understood that, if the logarithmic scale used is not 0.5 dB per step, the address increment of 48 should be changed to whatever value is closest to an increment of 24.08 dBs in energy. An alternative memory storage arrangement will be disclosed below that places these chained bytes next to each other in memory thus creating longer words to facilitate carry propagation using conventional binary adders.

After collecting the histogram of values in the above manner, as depicted in FIG. 2, the energies represented by the counts are summed. In the same way as 256 counts (occurrences) of the same value were explained above to be equivalent to one value 24.08 dB higher so the observation of any plural count of any value is equivalent to the observation of a single count of a higher value, i.e., a count of one in a higher-addressed memory location. For example, a count of two in address A is the same as a count of 1 in address A+3 dBs (A+6 in the case of 0.5 dB steps). Similarly, three equal values at address A equate to one value at address A+4.77 dBs (A+10 approximately), four equal values at A equate to one value at A+6 dBs (A+12) and so on. Because there will never be a count greater than 255 in any bin (assuming one 8-bit byte bins), a 255-entry look-up table in Read Only Memory (ROM) suffices to translate each possible count from 2 to 256 into the nearest integral number of addresses away that another count may be incremented in order to represent the same energy.

Figure 3:
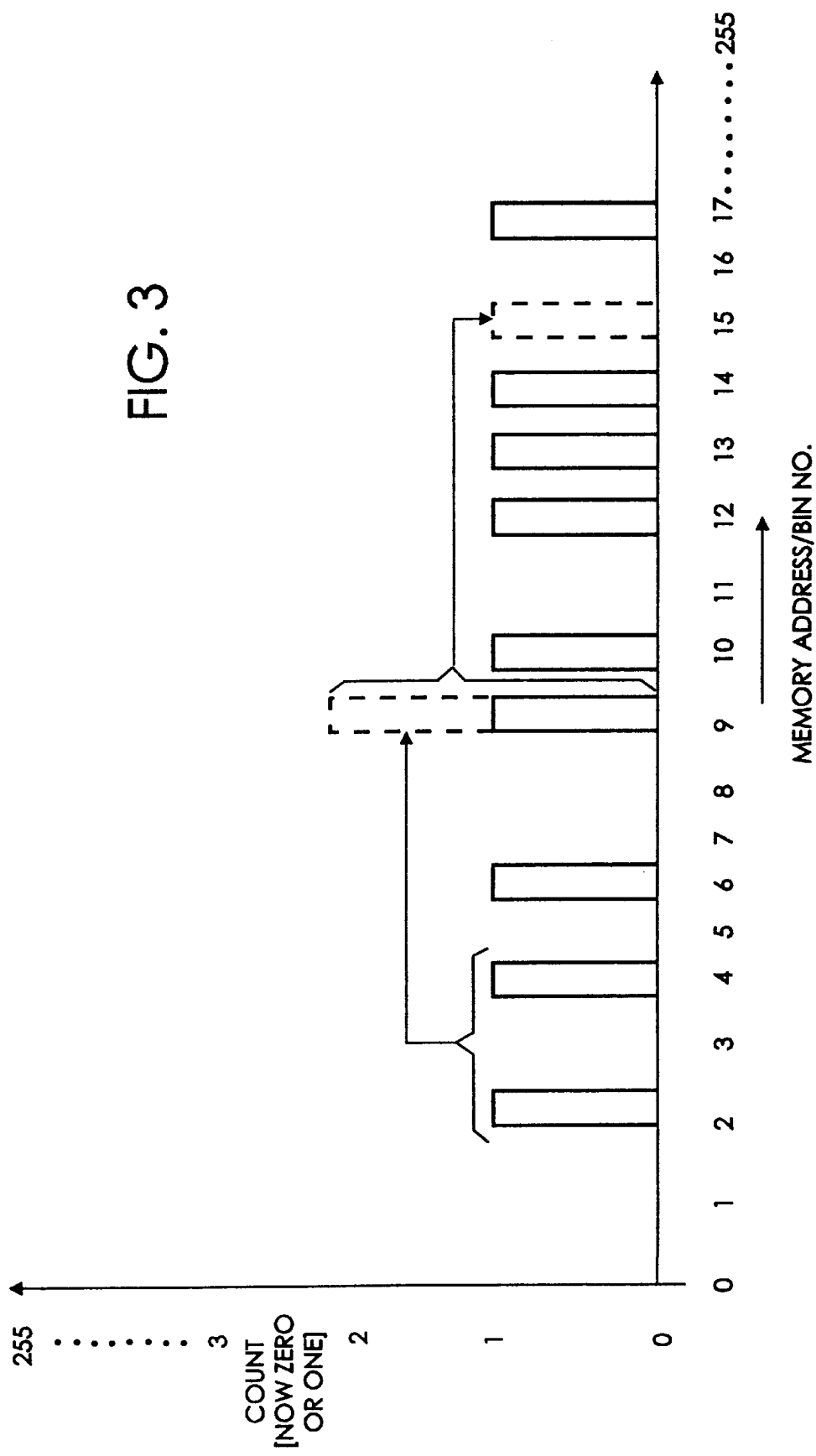
FIG. 3 is a graphical illustration of processing of the plurality of signal strength measurements as illustrated in FIG. 2.

The above procedure of replacing counts greater than 1 by increments to a count in a higher address in one embodiment of the present invention is applied iteratively starting with the lowest bin number until each bin finally contains only a count of one at most, as illustrated in FIG. 3. Further energy summation according to the illustrated embodiment of the present invention then utilizes means to combine single (unity) counts from different bins.

When quantities are represented as finite precision numbers using a non-linear mapping, such as either floating-point representation or the fixed-point logarithmic scale discussed above, there is a preferred order to combine such quantities to produce a number representative of the sum while reducing the effects of rounding error. It is easier to understand the preferred method through an example of a non-preferred method. Fixed precision logarithmic representations have the characteristic that the least significant bit of precision does not always represent the same amount. For example, if a quantity is represented by its base 10 logarithm with one decimal digit before the decimal point and one afterwards then the quantity 10 million is represented as "7.0" and "7.1" represents about 12.5 million, so incrementing the least digit from 0 to 1 increased the quantity represented by 2.5 million. On the other hand, the quantity 5 is represented by "0.7", and "0.8" represents a value of about 6.25, so incrementing the least digit by one in this case represented an increase in the quantity of only 1.25.

If a logarithmic addition unit is asked to combine two quantities having a great disparity in value such as 10,000,000 and 5, represented by their respective base 10 logarithms "7.0" and "0.7," to obtain the logarithm of their sum 10,000,005 in the same x.x representation, the answer will again be 7.0, as the logarithm of 10,000,005 is insufficiently different from the logarithm of 10,000,000 to be seen in the least significant digit of "7.0." Thus, the addition of 5 to 10,000,000 will not be seen however many times 5 is added. Even if 5 is added one million times, the result will still be the logarithm of 10,000,000 (i.e. "7.0") and not the logarithm of 15,000,000 as desired. Logarithmic quantities are, therefore, preferably not combined in the order "smallest plus largest," but rather the two smallest quantities are preferably combined together first to produce a sum which is larger than each of the two quantities. The sum is preferably be re-sorted in descending order of value with the remaining quantities to be summed and the two smallest quantities again combined and so forth until there are only two quantities left to combine, for example, the largest quantity and the sum of all the others. Thus, the sum of all the smaller quantities is a value closer to the largest quantity and has a better chance of affecting the least significant digit of the largest quantity when combined with it. Thus, if 5 is to be added to 10,000,000 one million times, it is better to add the one million 5's together first to obtain the logarithm of 5,000,000 as "6.7" and then the sum 5,000,000 can be combined with the 10,000,000 as the logarithmic addition of "6.7" and "7.0" to obtain the logarithm of the sum 15,000,000, as "7.2," which is the closest approximation for the fixed significant digits used to the more accurate value "7.176."

Consequently, proceeding from the situation reached in FIG. 3 comprises combining counts of lower value memory locations first to determine which higher-addressed memory location is equivalent to their sum. The two lowest non-zero entries in bins 2 and 4 are thus combined first. If the quantity in bin 4 is "X," the quantity in bin 2 is 1 dB lower, i.e., about "0.8X." Thus bin 4 combined with bin 2 is a quantity of "1.8X," which is $10LOG_{10}$ (1.8) which is 2.5 dB higher than "X." Thus, the combination is equivalent to a count in a bin 5 bins higher than bin 4 (i.e., bin 9). Bin 9 is thus incremented by one to collect the sum of bin 2 and bin 4. In the illustrated example of FIG. 3, bin 9 contained a 1 already and would increment to 2. A 2 in bin 9 is equivalent to a 1 in a 3 dB higher bin (i.e., 6 bins higher at bin 15). Bin 9 is thus incremented modulo-2, and becomes zero instead of two and a carry is generated to bin 15. Because bin 15 was zero in the illustrated example, it increments to 1 without a carry and carry propagation stops. Otherwise, the carry propagation would be allowed to continue through bins 9, 15, 21 etc. until it stops. It will be recognized by one of ordinary skill in the art that the carry procedure is binary addition with carries chained between bins that are 6 apart, or whatever separation corresponds to 3 dB or a factor of 2 in energy for the particular logarithmic (or monotonic) scale chosen.

Still referring to FIG. 3, after combining the entries in bins 2 and 4, the next two entries to be combined are in bins 6 and 10, the entry in bin 9 having been cleared to zero by the above carry operation. Bins 6 and 10 are 4 bins or 2 dB apart, so their relative values are "0.6X" for bin 6 and "X" for bin 10. Combining bins 6 and 10 results in a sum of "1.6X" which is 2 dB higher than "X." Thus the combination of bins 6 and 10 is equivalent to a count in the bin 2 dB (four places) higher than bin 10, i.e., bin 14. Consequently the entry in bin 14 is incremented to receive the combined energies of bins 6 and 10; this causes a carry to bin 20 and leaves bin 14 at zero in a manner like that described for the carry from bin 9 above. This process continues with the combination of bins 12 and 13 and so forth until all bins have been combined and the final combination results in a 1 being placed in a bin position, the address of which yields the logarithm of the sum of the original energies.

Figure 4:
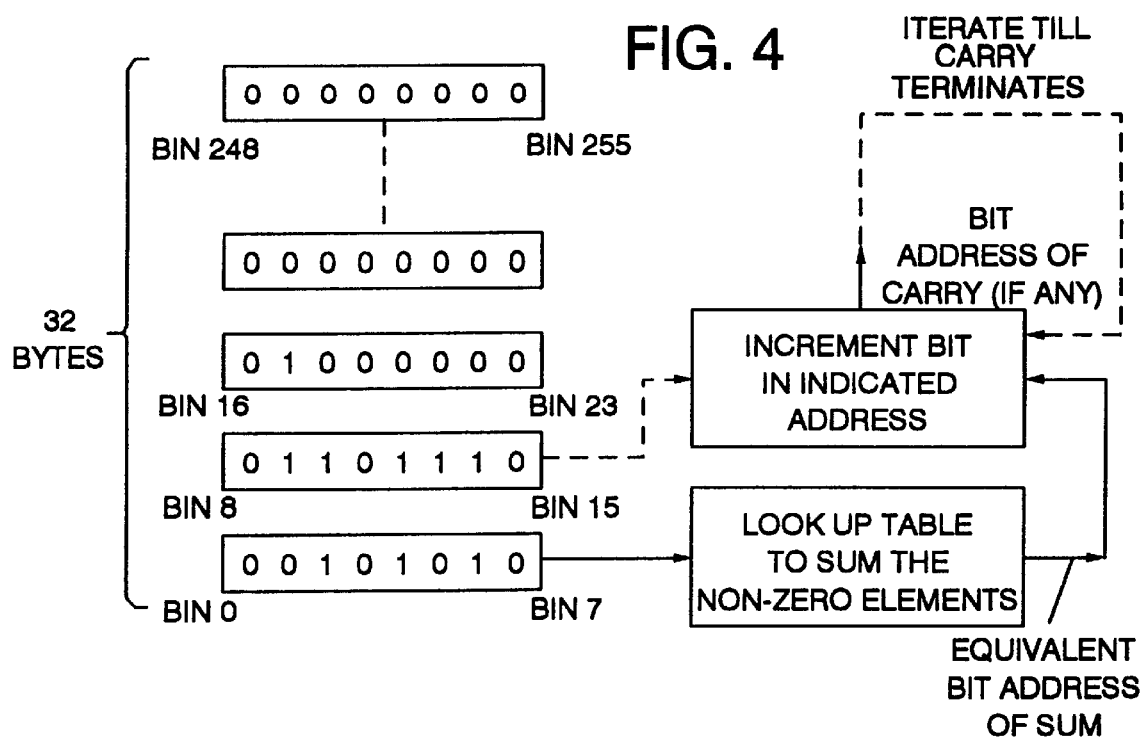
FIG. 4 schematically illustrates an embodiment of an apparatus according to the present invention.

In FIG. 3, after reduction from FIG. 2 of multiple occurrences of the same value to a single occurrence, the histogram memory contains only entries of 0 or 1, i.e., single-bit quantities. Therefore, the resulting information after reducing the counts as described with respect to FIG. 2 can be held in a smaller memory of 256 bits rather than 256 bytes. This compressed representation occupies only 32 bytes, as depicted in FIG. 4. Moreover, combination of the non-zero entries need not be limited to combination of pairs of bins. For example, eight bins at once, whose 0 or 1 entries occupy a single byte, may be combined simultaneously by using the byte to address a precomputed look-up table to obtain a number representative of the sum of all the non-zero entries contained in the byte. For example, if the byte contained the bit pattern 10010010 (with the most significant bit (associated with the higher value bin) on the left) then, denoting the quantity represented by the most significant bit by "X," the next bit to the right (3 bins lower at 0.5 dB per bin) represents a quantity 1.5 dB less than "X" or "0.7X" approximately, and the next bit 6 bins lower (3 dB) represents "0.5X." The whole byte thus represents a quantity of "X"+"0.7X"+"0.5X"="2.2X" which is 3.5 dB greater than "X." Thus the whole byte can be replaced by an entry in a bin 7 higher, which is accomplished by placing a 1 in the second most significant bit of the next byte. The look-up table entry for the above bit pattern would thus contain the value 15, being the number of the most significant non-zero bit (i.e., bit number 8) of the current byte (which was used as a reference value of "X") plus the increment of 7.

In binary, the decimal number 15 is 1111, which should be interpreted as 1.111 where the figure to the left of the decimal point indicates how many bytes higher in the memory to add a 1 (i.e., 1 byte higher in this case) and the 111 to the right of the decimal point indicates to which bit (i.e., 111=7 in this case) the 1 should be added. Note that the result of summing the non-zero entries in a byte may give a 1 in the same byte. The result of summing for the bit pattern 00000011 for example, is the bit pattern 10000000 to the nearest approximation in the same byte.

However, a byte that originally contains only one non-zero entry will not be changed by collating 1's in the above manner. Therefore, a means is also provided by the present invention to collate 1's from different bytes. This is provided according to one embodiment of the present invention by setting a flag when the result of collating 1's in a byte does not leave the all the bits in the byte reset to zero. The flag may be precomputed for all possible 8-bit patterns and stored in the look-up table. When the flag is set, which may for example be the most significant, or "sign," bit of the look-up table output byte, the remaining bits of the lookup table output value can indicate the bit position in the byte which is left at 1 after collation. Upon performing collation on the next non-zero byte, if the flag is set from a previous collation operation, the left behind quantity from the previous operation is first combined with the lowest order non-zero bit of the new byte using the procedure previously described for combining bins in relation to FIG. 3. Thus, attempting to combine 8 bits at a time may speed up the summation process, but may not totally supplant the need to combine single bits.

Figure 5:
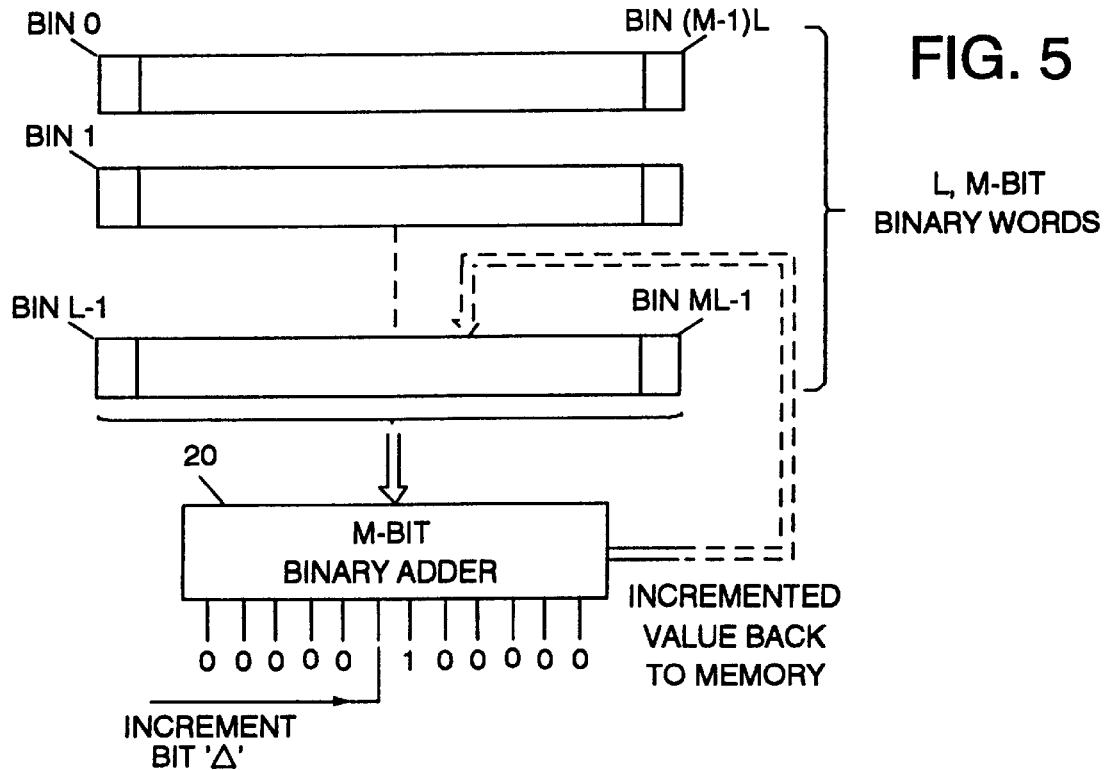
FIG. 5 schematically illustrates a further embodiment of an apparatus according to the present invention.

When, as illustrated in FIG. 3, bin 9 was incremented from 1 to 2, causing it to reset to zero and generate a carry to bin 15, the process is binary addition with carries that jump 6 bits at a time. By rearranging the compressed memory of FIG. 4 in the manner illustrated in FIG. 5, such that bits 6 apart appear in the same word, a conventional binary adder may be used for adding a 1 to any bit of the word. In general, if the logarithmic scale chosen has L bin separations representing 3 dB (or more accurately a 2:1 increase in the quantity represented), then every Lth one-bit bin may be made to lie in the same binary word. Thus, as illustrated in FIG. 5, a first word contains M bins 0, L, 2L . . . ; a second word contains M bins 1, L+1, 2L+1 . . . and so on to an Lth M-bit word which contains bins L−1, 2L−1, 3L−1 . . . .

When any bin is to be incremented, the word which contains the bit corresponding to the bin to be incremented is read into binary adder 20, where it is added with another M-bit word containing all zeros apart from a 1 in the bit position which is to be incremented. The normal binary carry operation takes care of the carry requirements of the method. The determination of which bit is to be incremented was previously described, namely by collating pairs or more non-zero bits together using a look-up table to determine the bin number or bit position of a higher bin that must have "1" added to it to represent a quantity equivalent to the sum of the collated bins, i.e., bit number 15 in the above example. Thus collating 1's from the vertical column consisting of bins 0, 1, 2 . . . L−1 in FIG. 5 (i.e., across the least significant bits of all words) will, after addressing a look-up table using those L bits, be found equivalent to incrementing a particular bit in a particular word, which is then performed using adder 20. Alternatively, a look-up table can be precomputed for collating 1's horizontally, i.e., across the same M-bit word of FIG. 5. Because the bit-weights (represented signal magnitude) within one word are related in the binary series 1:2:4:8 . . . etc., this look-up table is the same look-up table for converting binary integers to logarithms that was used for reducing the histogram of FIG. 2 to the single-bit entries of FIG. 3. Either method may be used depending on which is most efficient for programming in a particular microprocessor instruction set or application.

A particularly simple method of logarithmically accumulating RSSI values will now be described with reference to FIG. 5. Suppose the total range of RSSI values that a receiver can measure is 128 dB, with measurements being represented by an 8-bit word having 0.5 dB least significant bit (LSB) value. More accurately, the LSB value is 10 LOG10(2)/6, which is very close to 0.5. Thus, the bins of FIG. 5 form six words of 43 bits each, which gives 258 bins, enough to encompass the 256 possible values. Adjacent bits in each word represent energy levels a factor of two apart, and so an observed RSSI value is recorded simply by adding 1 to the appropriate bin number 0 to 255 as addressed by its 8-bit value. When a "1" is added to a bin, the ripple carry is allowed to flow through the word containing that bin. Because the most significant bit (MSB) of the word represents a very high energy level, no overflow is expected unless accumulating a very large number of strong-signal RSSI values, but overflow can be prevented by allowing some headroom on the word length, by increasing the word length from 43 to 48 bits, for example. The MSB then represents an energy level approximately 32 times or 15 dB greater than the highest RSSI value.

After accumulating all RSSI values in this manner, the six, 48-bit words are each a partial logarithmic sum of the total energy and are then further combined to yield the final sum. This may be accomplished by logarithmic addition or by any of the methods described herein. Thus, the accumulation of arbitrarily large numbers of RSSI values is reduced to essentially the combination of six binary words, each representing a partial logarithmic sum from different "slices" of the total dynamic range separated by 0.5 dB.

Figure 6C:
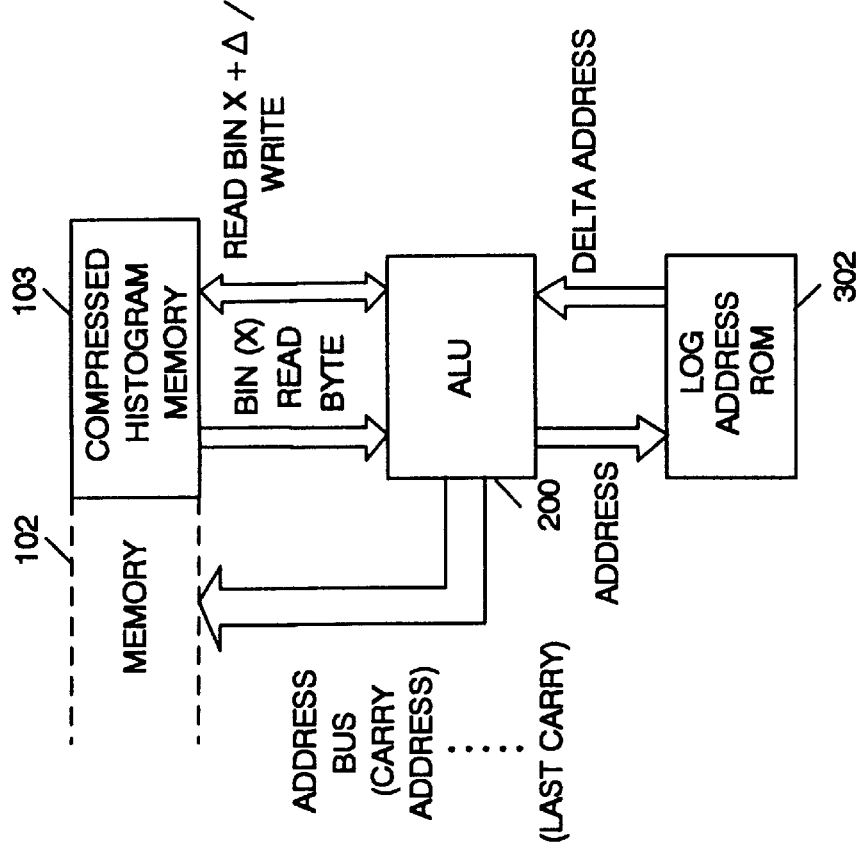
FIG. 6C is a schematic block diagram of a processor architecture according to a further embodiment of the present invention.
Figure 6B:
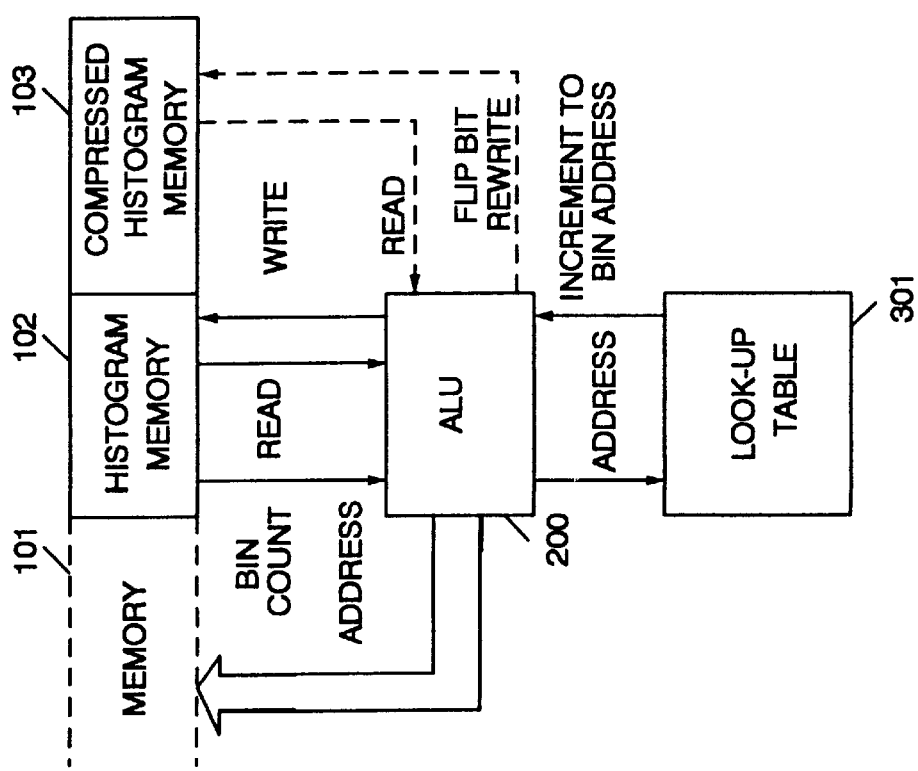
FIG. 6B is a schematic block diagram of a processor architecture according to another embodiment of the present invention.

FIGS. 6A, 6B, and 6C illustrate embodiments of an apparatus according to the present invention utilizing microprocessor architectures implementing the methods described above. In FIG. 6A, memory 100, including memory segments 101, 102, 103, is addressed by Arithmetic/Logic unit ("ALU") 200 which reads values from and/or writes values to memory 100. In providing for carrying out the objective of measuring received signal strength, memory 101 provides a means for saving the logarithmic signal strength measurement values to be combined and ALU 200 is controlled by a program to carry out the method aspects of the present invention and to read values sequentially from memory 101. Each read value is then used to address a particular bin of histogram memory 102 which is then incremented. When all values have been read from memory 101, memory 102 contains counts of how many times each discrete signal strength measurement value occurred in memory 101.

FIG. 6B illustrates a system providing means for reduction of the histogram memory to the compressed form having only single-bit bins according to the method aspects of the present invention described previously. As illustrated in FIG. 6B, ALU 200 is programmed to read counts sequentially from histogram memory 102 and to use each count to address logarithmic look-up table 301. Look-up table 301 returns the logarithm of the count in terms of the increment to the current bin number needed to point to the bin number where a 1 should be placed to be equivalent to the total quantity in the histogram bin. This 1 can be written directly to compressed memory 103, by a read, increment and rewrite operation to take care of any carries that may result from the compressed memory already containing a 1 in the position to be incremented.

FIG. 6C illustrates the operation of collating 1's in compressed memory 103 to obtain the final logarithmic sum. In carrying out this operation, ALU 200 reads a byte at a time, which is applied to a second look-up table 302 that returns the logarithm of the sum of all the non-zero elements of the byte, in terms of an increment or delta-number of bins away from the current byte where a bit shall be incremented to represent the sum. ALU 200 adds the delta-number to the current byte address to obtain the address of the byte containing the bit to be incremented. That byte is then read, the appropriate bit incremented, and then carries are performed according to the method described above if the bit incremented was already a 1.

As will be appreciated by those of skill in the art, the above described aspects of the present invention in FIGS. 4, 5, 6A, 6B, and 6C may be provided by hardware, software, or a combination of the above. While the various components of the apparatus of the present invention have been illustrated in part as discrete elements in these Figures, they may, in practice, be implemented by a microcontroller including input and output ports and running software code, by custom or hybrid chips, by discrete components or by a combination of the above.

Figures 7, 7A:
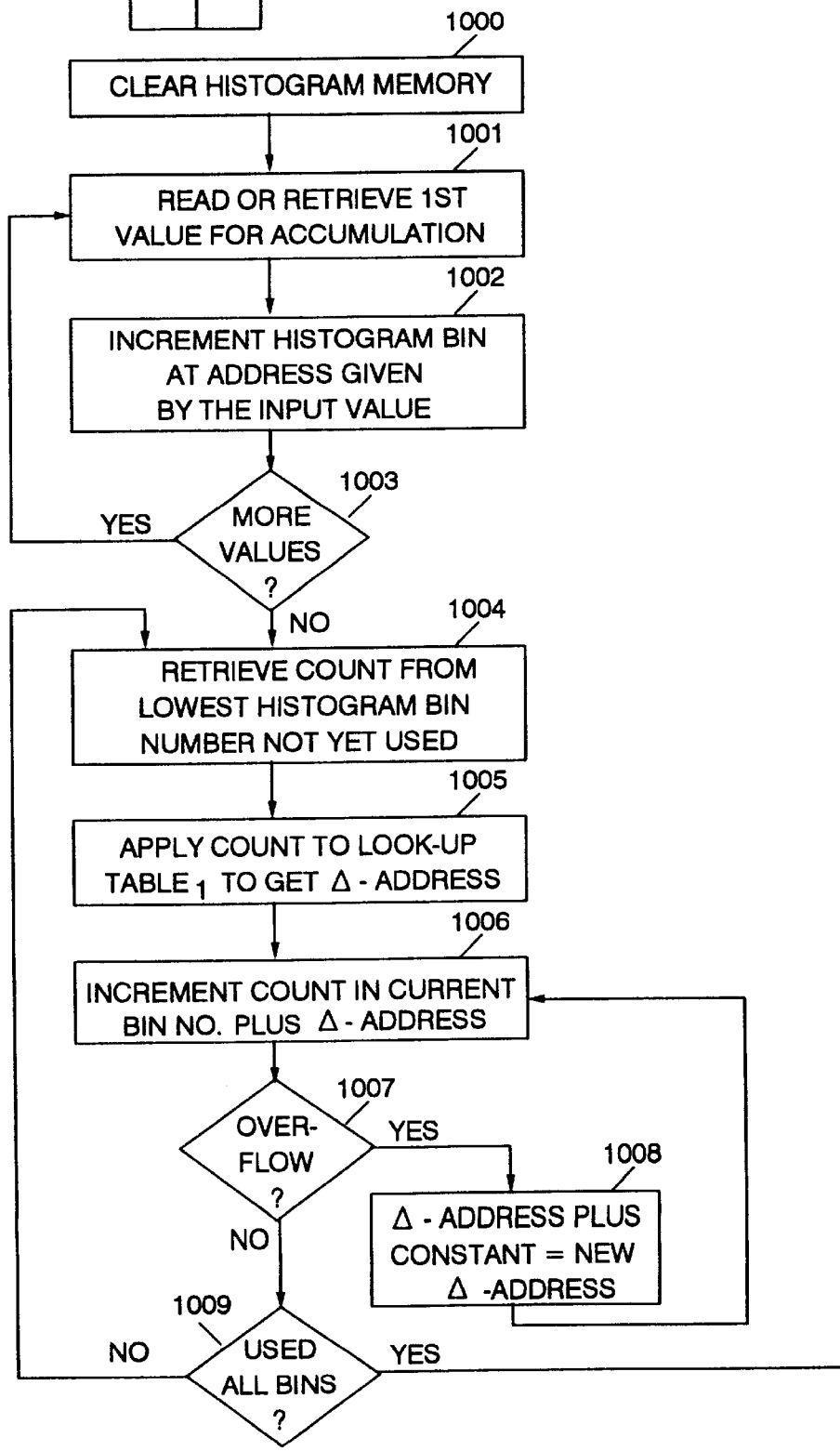
FIG. 7 is a schematic illustrating the relationship between FIG. 7A and FIG. 7B.
FIG. 7A is a flowchart illustrating operations according to an embodiment of the present invention.
Figure 7B:
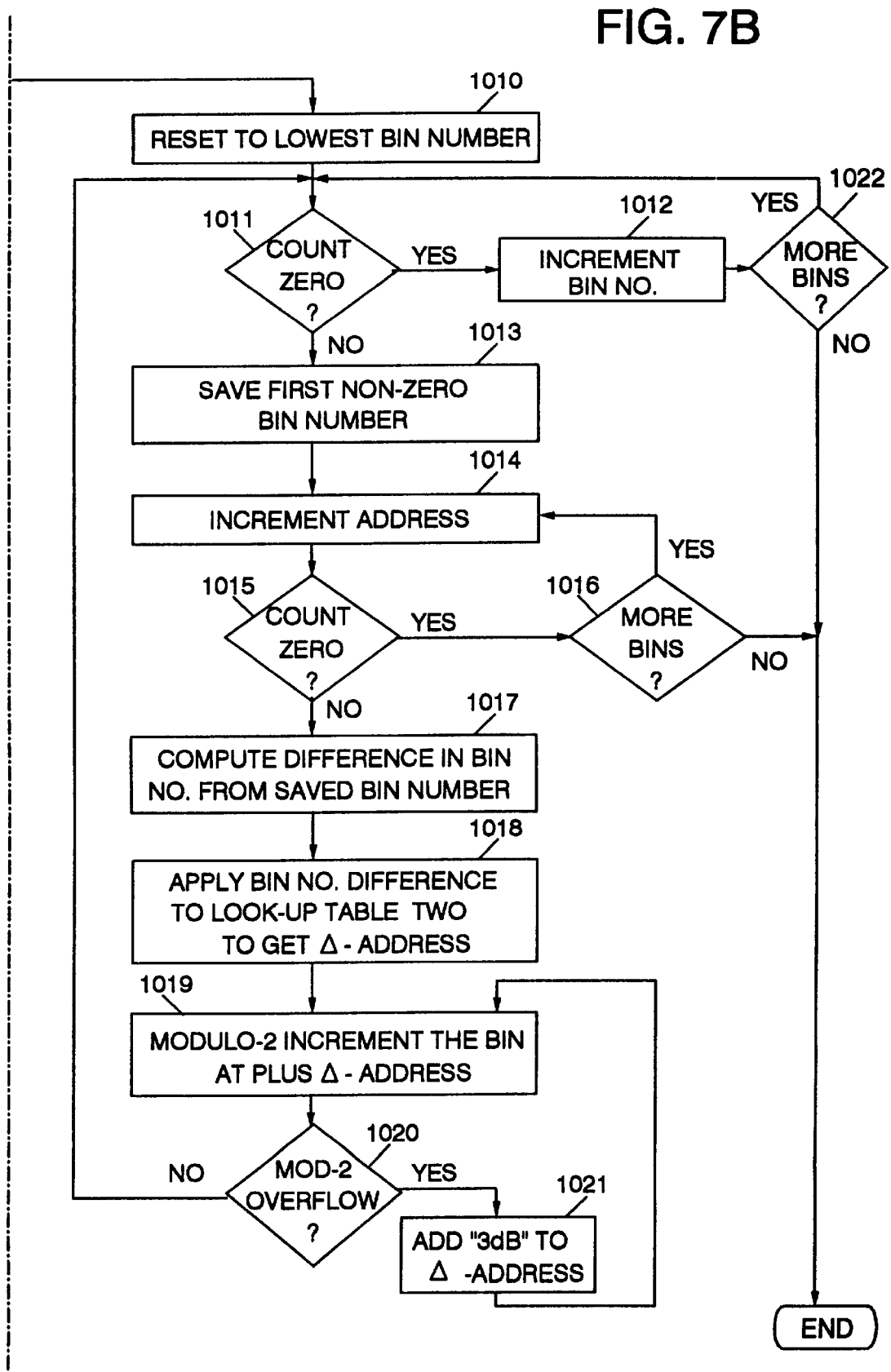
FIG. 7B is a flowchart illustrating operations according to an embodiment of the present invention.

FIGS. 7A and 7B are flowcharts illustrating operations of one embodiment of the methods of the present invention. At block 1000, the histogram memory elements are reset to zero and are ready to accumulate a new set of signal strength measurement values. At block 1001, a value is input from a signal strength measurement to the A/D convertor, or, alternatively, a previously stored value is retrieved from memory 101. The value indicates an address in the memory 102 to be incremented at block 1002, thus recording an occurrence of that particular value. At block 1003, a test is made to determine if more input values shall be accumulated. If so, a return is made to block 1001 to get the next value, otherwise the method proceeds to block 1004 to begin reducing the complete histogram contained in histogram memory 102.

Processing at block 1004 begins with the lowest numbered bin, i.e., with the count contained in histogram memory 102 at an address containing a count giving the number of times the smallest possible magnitude value of the measured signal was observed. The count indicating the number of times the smallest magnitude value was detected is retrieved from histogram memory 102. This count is used to address a look-up table at block 1005 to determine a bin number "delta" higher than the current bin number where a count of 1 is equivalent to a multiple count retrieved at block 1004. If the count at block 1004 already contains a value of 1, then operations at blocks 1005 to 1008 do not need to be performed. Otherwise, a count greater than 1 is reduced by incrementing, at block 1006, the count in the bin number "delta" higher than the current bin. At block 1007, a check for bin count overflow is made. If the increment resulted in an overflow such that the count became zero, the number of times that particular value occurred exceeded the maximum bin count by one and the total of (MAXCOUNT+1)×

VALUE is then equivalent to a count of 1 in a yet higher numbered bin which is always a constant number of bins away as determined by the logarithm of (MAXCOUNT+1). This constant number of bins is thus added to the value of "delta" at block 1008 and a return to block 1006 is made iteratively until no further overflows are detected at block 1007. Operations then proceed to block 1009 to determine if any further bins are to be processed. If so, a return is made to block 1004 to process the next bin. Otherwise, operations proceed to block 1010 with all bins now contain counts of only zero or one, multiple counts having been converted to single counts in an appropriate higher-numbered bin.

At block 1010, the current bin number is reset to the lowest numbered bin. Optionally, modifications can be made to effect return to the lowest numbered NON-ZERO bin, to avoid processing zero bins; however, block 1011 can alternatively be used to test for non-zero bins and to skip over them. When at block 1011 a non-zero count is detected, its bin number is saved at block 1013. At block 1014, the address is incremented to find the next non-zero bin number as determined by checking at block 1015. If at block 1016 it is determined that no more bin numbers exist, operations exit with the bin number saved at block 1013 indicative of the desired logarithmic sum. Otherwise, if a second non-zero bin is detected at block 1015, its bin-number spacing from the bin number saved at block 1013 is computed at block 1017 and the bin-spacing used to address a look-up table at block 1018 to determine a higher-numbered address where a count of 1 is equivalent to the sum of the values of the first non-zero bin (from block 1013) and the second non-zero bin (found at block 1015). The look-up table returns the delta-address from the last-found non-zero bin to be incremented. The bin at the delta-address location is incremented at block 1019, after resetting the last-found non-zero bin to zero. The purpose of the latter is that the bin incremented at block 1019 may be the same as the last-found non-zero bin (for example, if the sum of the values is insufficiently greater than the larger of the two resulting in a rounding showing no increase over the larger value for the sum). Thus, after block 1019, the last-found non-zero bin would then retain an unchanged count.

Another possibility is that the bin count may become greater than 1 after block 1020. Use of modulo-2 incrementing provides that the bin increments to zero in this event while indicating modulo-2 overflow. The overflow is detected at block 1020 and at block 1021 the spacing of a higher addressed bin is determined where a count of 1 is equivalent to a count of 2 in the current bin. Instead of a count of two in the current bin, a return is made to add a count of one into this higher addressed bin, and the process iterates in the form of a ripple-through carry effect until no overflow is detected at block 1020. A return is made to block 1011 with the bin-address still equal to the last-found non-zero bin address. The bin count may now be zero in which case blocks 1011 and 1012 will skip over bins until a non-zero bin is found or until all bins have been tested. Thus, either the last-found non-zero bin address or a new non-zero bin address is saved at block 1013 and the process continues until an exit is made from block 1012 or block 1016 indicating that all bins are exhausted. The bin address saved at block 1013 is then indicative of the desired logarithmic sum.

Figure 8A:
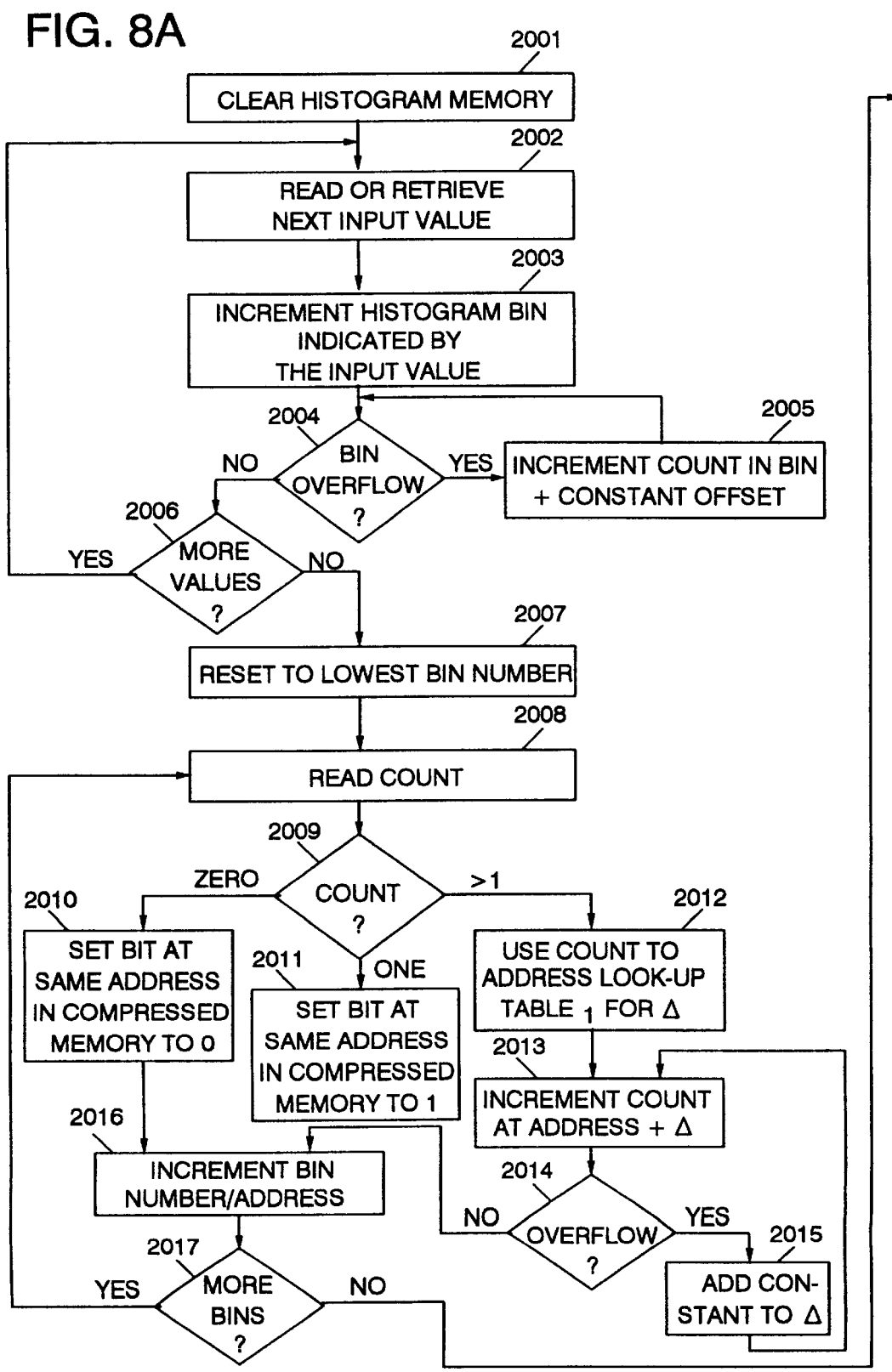
FIG. 8A is a flowchart illustrating operations according to another embodiment of the present invention.
Figure 8B:
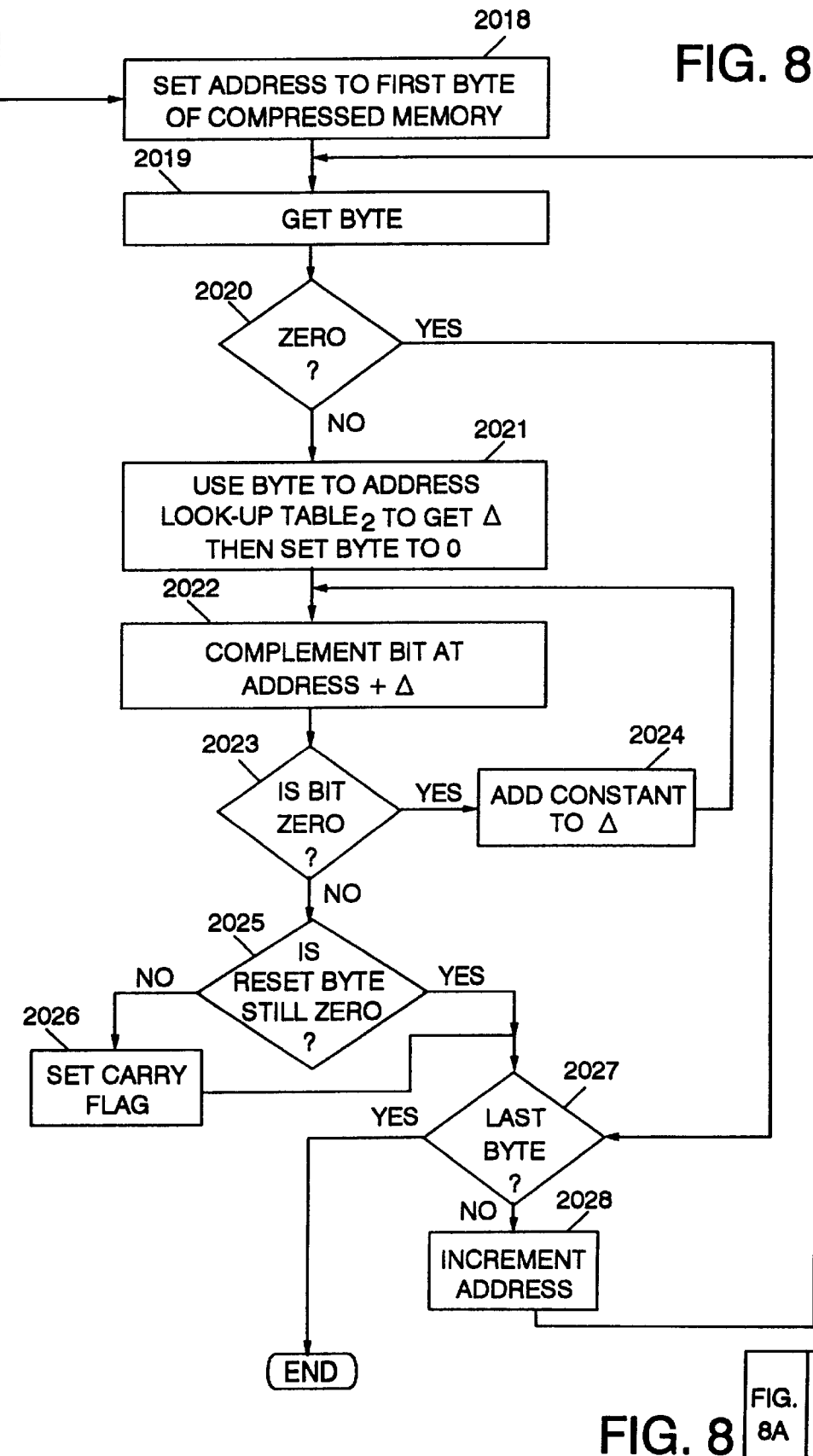
FIG. 8B is a flowchart illustrating operations according to another embodiment of the present invention.

As illustrated in FIGS. 7A and 7B, operations at blocks 1000 to 1009 effectively reduce multiple observations of a lower value into a single occurrence of a higher value. The novel method described here for logarithmic arithmetic is similar to the use of multiplication in ordinary, linear arithmetic instead of repeated addition. After reduction of multiple counts to single counts, the memory contains counts of only zero or one. Therefore, a more compact storage of these single bit values can be used. FIGS. 8A and 8B illustrate an embodiment of the present invention providing for the use of more compact storage to further accelerate logarithmic accumulation. Operations at blocks 2001 to 2017 provide for the construction and then the reduction of the histogram as described previously in connection with FIGS. 7A and 7B. However, additional details of these operations are illustrated in the embodiment of operations of FIG. 8A and 8B that were not discussed in connection with FIGS. 7A and 7B. For example, in building a histogram of observed input measurement values, a test for bin overflow is made at block 1004 and the logarithmic carry to a higher numbered bin which is LOG (MAXCOUNT+1) higher (as described in connection with block 1007 of FIGS. 7A and 7B) is made at block 2005. Also, at block 2009, if the bin count is already zero or one the value may be directly recorded in compressed memory at blocks 2010 or 2011 respectively. Reduction of multiple occurrences need only be done as illustrated at blocks 2012 to 2015 when multiple occurrences are detected at block 2009. When at block 2017 it is detected that all bins have been reduced, operations continue at block 2018 to process the single-bit values now contained in compressed memory. For the illustrated embodiment of operations of FIGS. 8A and 8B, as compared to the embodiment of FIGS. 7A and 7B, single-bit counts are processed 8 bits at a time by processing bytes. However, it is to be understood that the benefits of the present invention are not limited to such an embodiment and may be obtained while processing any number of bits at a time by use of an appropriate sized look-up table at block 2021.

A byte (or word of determined length) retrieved from compressed memory at block 2019 is used, if not detected to be zero at block 2020, to address a look-up table at block 2021 to determine the spacing or bin number "delta" to a higher-numbered bin where a bit value of 1 in an appropriate bit position is equivalent to the sum of all measurement values represented by all the non-zero bits of the current byte. The look-up table contains a "delta" address pointing to a byte to be incremented and a bit number within that byte to be incremented. The indicated bit in the byte at "address+delta" is then incremented modulo-2 at block 2022 and modulo-2 overflow is checked at block 2023. If overflow is detected, i.e., if the bit incremented to zero, then the count which would have been 2 is replaced by an increment of 1 to a higher-numbered (addressed) bin representative of twice the amount. The higher-numbered bin is LOG(2) away from the current bin, and LOG(2) is thus the constant added to "delta" at block 2024. The ripple-carry loop comprised of blocks 2022, 2023 and 2024 is, as explained above with reference to FIG. 5, equivalent to normal binary addition if bits LOG(2) apart in compressed memory are chained together to form a binary word.

The sum of all the non-zero bits in a byte may at times result in a single 1 in the same byte; that is, at block 2021 the byte address "delta" is zero and the bit incremented at block 2022 is a bit in the same byte. Thus, the current byte is reset to zero in block 2021 before performing the increment at block 2022. If at block 2025 the current byte has remained reset to zero, it indicates that the contents of the byte have been transferred to a higher-numbered byte. Otherwise, if the byte is not zero, it indicates that the contents of the byte remained with the byte and are to be carried forward. At block 2026, therefore, a carry flag is set to indicate the bit address of the remaining 1 in the current byte which must be accumulated with a higher-numbered byte as will be explained more fully herein. If block 2027 operations detect that all bytes have been processed, an exit is made with the bit address of the last 1 in compressed memory indicative of the desired logarithmic sum. Otherwise, the byte address is incremented at block 2028 and a return made to block 2019 to continue processing bytes.

In FIGS. 7A, 7B, 8A and 8B, when the maximum bin count, denoted by MAXCOUNT, is exceeded a carry to a higher order bin is executed. In compressed memory, when a value of 1 is incremented, a carry is likewise made to a higher numbered bin. The latter is the same as the former when MAXCOUNT is equal to one. Thus by setting MAX-COUNT equal to one, it is possible to directly accumulate the histogram of values in single-bit memory, as is illustrated by the flowchart of operations of FIGS. 9A and 9B.

Referring now to FIGS. 9A and 9B, operations for the illustrated embodiment start at block 3001 by clearing all bits to zero. A new value is then input at block 3002, the value indicating the address of a bit in memory to be incremented. The incrementing is performed modulo-2 at block 3003, with ripple-through carry being detected at block 3004 and propagated at block 3005, for example by chaining together bits LOG(2) apart in memory to form a binary word. When all values are detected to have been input at block 3006, the method continues from block 3007 just as from block 2018 of FIGS. 8A and 8B. In FIGS. 9A and 9B, details of the carry flag usage are further illustrated.

Starting at block 3007 with the first byte, its value is retrieved at block 3008 and tested at block 3009. If it is zero, a skip is made to block 3017 which detects whether all bytes have been processed. If not, the byte address being processed is incremented at block 3018 and a return made to block 3008 to get the next byte. When the byte is non-zero, operations at block 3010 check if the "carry flag" is set. The carry flag indicates if a previously processed byte was left in a non-zero state. If so, blocks 3019 to 3024 bring forward the value of the previously processed byte to accumulate with the current byte. In one embodiment these operations are provided by accumulating the non-zero bit of the previously processed byte with the lowest non-zero bit of the current byte.

As was described previously, logarithmic accumulation preferably accumulates values in the order smallest to next smallest in order to minimize rounding effects. At block 3020, therefore, the bit-spacing is determined between a previously processed bit which remains a non-zero value and the lowest non-zero bit of the current byte. This bit position difference is applied to a look-up table at block 3021 to obtain the higher bit address representative of the sum of the two non-zero counts. The bit address returned from the look-up table may be the same bit as the lowest non-zero bit of the current byte (where rounding results in no increase because of the relative value difference with widely spaced bit values), so that the lowest non-zero bit of the current byte bit is reset to zero at block 3022 before incrementing the bit at the higher bit address representative of the sum of the two non-zero counts. If modulo-2 overflow is detected at block 3023, a carry is made to the bit LOG(2) higher whose address is determined at block 3024. This is also equivalent to binary addition when bits LOG(2) apart are chained to form a binary word. When the carry has fully propagated, a return is made to block 3009 to determine if the current byte is now zero and the process continues from that point.

If at block 3010 the carry flag is not set, any previous carry flag having been reset at block 3019, the values represented by all the non-zero bits of the byte are collated at block 3011. This is done for the illustrated embodiment by using the byte to address a look-up table giving the address of a higher-numbered bit to receive an increment representing the sum. The bit at the higher-numbered address is then incremented at block 3012, and any carry is dealt with by carry propagation loop blocks 3013, 3014 and 3012 which may also operate by means of ordinary binary addition as above. When the carry is fully propagated, block 3015 checks if the current byte is now zero or not. If it is zero, its entire contents have been collated into a higher byte and it may be forgotten. Otherwise, a non-zero bit remains in the byte being processed, the carry flag is set at block 3016, and the bit address of the non-zero bit is saved. Block 3017 then determines if further bytes are to be processed, and if not, an exit is made with the saved bit address indicative of the desired logarithmic sum. The operations for various embodiments of the present invention described above may be further modified by a person skilled in the art desirous of efficiently accumulating a large number of values represented on a logarithmic (or other non-linear but monotonic) scale.

The present invention has been described above with respect to FIGS. 7A, 7B, 8A, 8B, 9A, and 9B with reference to flowcharts illustrating the operation of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for determining a signal strength of a received signal, the method comprising the steps of:

taking a plurality of signal strength measurements of the received signal, wherein the signal strength measurements have an associated value selected from a predetermined number of values;

accumulating a number of occurrences of the signal strength measurements corresponding to each of the predetermined number of values; and determining a signal strength of the received signal from the accumulated number of occurrences.

2. The method of claim 1 wherein said accumulating step comprises the step of accumulating the number of occurrences of the signal strength measurements in a plurality of counters, each counter being associated with one of the predetermined number of values.

3. The method of claim 2 wherein the predetermined number of values are monotonically related to the signal strength measurements.

4. The method of claim 3 wherein the predetermined number of values represent the logarithms of the signal strength measurements.

5. The method of claim 3 wherein said step of determining a signal strength comprises the step of reducing a value count of a first one of the plurality of counters having a value count greater than one by decreasing the value count of the first one of the plurality of counters and incrementing a second one of the plurality of counters, the first one of the plurality of counters having one of the predetermined number of values as an associated signal strength measurement value.

6. The method of claim 5 wherein said second one of the plurality of counters has an associated signal strength measurement value corresponding to a multiple of the associated signal strength measurement value of the first one of the plurality of counters.

7. The method of claim 5 wherein said step of determining a signal strength further comprises the step of incrementing a third one of the plurality of counters if the second one of the plurality of counters overflows.

8. The method of claim 5 wherein said step of determining a signal strength further comprises the step of repeating said step of reducing until none of the plurality of counters have a value count greater than one.

9. The method of claim 8 wherein said step of determining a signal strength further comprises the step, following said step of repeating, of storing the value counts of each of the plurality of counters in single bit memory elements.

10. The method of claim 8 wherein said step of determining a signal strength further comprises the step of replacing a non-zero count in two of the plurality of counters by incrementing another of the plurality of counters.

11. The method of claim 10 wherein said step of determining a signal strength further comprises the step of repeating said step of replacing a non-zero count in two of the plurality of counters by incrementing another of the plurality of counters until only one of the plurality of counters contains a non-zero count corresponding to a sum of the plurality of signal strength measurements to thereby provide an indication of the signal strength.

12. The method of claim 11 wherein the received signal is a signal received over a communications medium at a receiver station from a sender station.

13. The method of claim 12 wherein the communications medium is a wireless communications medium.

14. A method for determining a signal strength of a received signal using single bit memory elements each of which corresponds to one of a discrete number of values representing signal strength magnitude of the received signal comprising the steps of:

initializing the single bit memory elements to zero;

taking a signal strength measurement of the signal to provide a signal strength measurement value;

incrementing a first one of the single bit memory elements corresponding to the signal strength measurement value using modulo-2 arithmetic;

incrementing a second one of the single bit memory elements corresponding to twice the value of the first one of the single bit memory elements using modulo-2 arithmetic if a carry is generated by said step of incrementing a first one of the single bit memory elements;

propagating any carry from said step of incrementing a second one of the single bit memory elements by iteratively incrementing a single bit memory element corresponding to twice the value of a single bit memory element generating a carry; and repeating said taking a signal strength measurement, incrementing a first one of the single bit memory elements, incrementing a second one of the single bit memory elements and propagating any carry steps until a desired number of signal strength measurements have been accumulated to provide a non-zero one of the single bit memory elements corresponding to one of the discrete number of values indicating the sum of the signal strength measurements.

15. The method of claim 14 wherein single bit memory elements having corresponding values related by a factor of two are chained together to form a binary word.

16. An apparatus for determining a signal strength of a received signal, comprising:

means for taking a plurality of signal strength measurements of the signal wherein the signal strength measurements have an associated value selected from a predetermined number of values;

means for accumulating a number of occurrences of the signal strength measurements corresponding to each of the predetermined number of values; and means for determining a signal strength of the received signal from the accumulated number of occurrences.

17. The apparatus of claim 16 wherein said means for accumulating comprises a plurality of counters, each of said counters being associated with one of the predetermined number of values.

18. The apparatus of claim 17 wherein the predetermined number of values are monotonically related to the signal strength measurements.

19. The apparatus of claim 18 wherein the predetermined number of values represent the logarithm of the signal strength measurements.

20. The apparatus of claim 18 wherein said means for determining a signal strength comprises means for reducing a value count of a first one of the plurality of counters having a value count greater than one by decreasing the value count of the first one of the plurality of counters and incrementing a second one of the plurality of counters.

21. The apparatus of claim 20 wherein said second one of the plurality of counters has an associated signal strength measurement value corresponding to a multiple of the associated signal strength measurement value of the first one of the plurality of counters.

22. The apparatus of claim 20 wherein said means for determining a signal strength further comprises means for incrementing a third one of the plurality of counters if the second one of the plurality of counters overflows.

23. The apparatus of claim 22 wherein said means for determining a signal strength further comprises means for storing the value counts of each of the plurality of counters in single bit memory elements.

24. The apparatus of claim 22 wherein said means for determining a signal strength further comprises means for replacing a non-zero count in two of the plurality of counters by incrementing another of the plurality of counters.

25. The apparatus of claim 24 wherein the received signal is a signal received over a communications medium at a receiver station from a sender station.

26. The apparatus of claim 25 wherein the communications medium is a wireless communications medium.

27. An apparatus for determining a signal strength of a received signal comprising:
- a plurality of single bit memory elements each of which is associated with one of a discrete number of values representing signal strength magnitude of the received signal;
- means for initializing the single bit memory elements to zero;
- means for taking a signal strength measurement of the signal to provide a signal strength measurement value;
- means for incrementing a first one of the single bit memory elements corresponding to the signal strength measurement value using modulo-2 arithmetic;
- means for incrementing a second one of the single bit memory elements corresponding to twice the value of the first one of the single bit memory elements using modulo-2 arithmetic if a carry is generated by said means for incrementing a first one of the single bit memory elements; and
- means for propagating any carry from said means for incrementing a second one of the single bit memory elements by iteratively incrementing a single bit memory element corresponding to twice the value of a single bit memory element generating a carry.

28. The apparatus of claim 27 wherein ones of the single bit memory elements having corresponding values related by a factor of two are chained together to form a binary word memory element.

29. A computer program product for determining a signal strength of a received signal, the computer program product comprising:
- a computer-readable storage medium having computer-readable program code means embodied in said medium, said computer-readable program code means comprising:
  - computer-readable program code means for taking signal strength measurements of the received signal wherein the signal strength measurements have an associated value selected from a predetermined number of values;
  - computer-readable program code means for accumulating a number of occurrences of the signal strength measurements corresponding to each of the predetermined number of values; and
  - computer-readable program code means for determining the signal strength of the received signal from the accumulated number of occurrences.

30. The computer program product of claim 29 wherein the predetermined number of values are monotonically related to the signal strength measurements.

31. The computer program product of claim 30 wherein the predetermined number of values represent the logarithms of the signal strength measurements.

32. The computer program product of claim 30 wherein the received signal is a signal received over a communications medium at a receiver station from a sender station.

33. The computer program product of claim 32 wherein the communications medium is a wireless communications medium.

34. A computer program product for determining a signal strength of a received signal having a plurality of single bit memory elements each of which is associated with one of a discrete number of values representing signal strength magnitude of the received signal, the computer program product comprising:
- a computer-readable storage medium having computer-readable program code means embodied in said medium, said computer-readable program code means comprising:
  - computer-readable program code means for initializing the single bit memory elements to zero;
  - computer-readable program code means for taking a signal strength measurement of the signal to provide a signal strength measurement value;
  - computer-readable program code means for incrementing a first one of the single bit memory elements corresponding to the signal strength measurement value using modulo-2 arithmetic;
  - computer-readable program code means for incrementing a second one of the single bit memory elements corresponding to twice the value of the first one of the single bit memory elements using modulo-2 arithmetic if a carry is generated by said computer-readable program code means for incrementing a first one of the single bit memory elements; and
  - computer-readable program code means for propagating any carry from said computer-readable program code means for incrementing a second one of the single bit memory elements by iteratively incrementing a single bit memory element corresponding to twice the value of a single bit memory element generating a carry.

35. The computer program product of claim 34 wherein ones of the single bit memory elements having corresponding values related by a factor of two are chained together to form a binary word memory element.

36. An apparatus for determining a signal strength of a received signal, comprising:
- a receiver that receives instances of the received signal and provides a plurality of signal strength measurements corresponding to instances of the received signal;
- a converter that converts the signal strength measurements to an associated value selected from a predetermined number of values;
- a signal strength measurement memory that stores ones of the associated values;
- a histogram memory that stores counts associated with ones of the predetermined number of values; and
- a processor that accumulates in the histogram memory a number of occurrences of the signal strength measurements corresponding to ones of the predetermined number of values by incrementing ones of the stored counts in the histogram memory associated with ones of the predetermined number of values based on ones of the associated values stored in the signal strength measurement memory and determines a signal strength of the received signal from the accumulated number of occurrences.

* * * * *